United States Patent [19]

Breslow et al.

[11] Patent Number: 4,530,499
[45] Date of Patent: Jul. 23, 1985

[54] DOMINO, OR THE LIKE, PLACING VIDEO GAME

[75] Inventors: Jeffrey D. Breslow, Highland Park; Howard J. Morrison, Deerfield; Richard A. Ditton, Arlington Heights; Steven M. Meyer, Chicago; Robert S. Morrison, Vernon Hills, all of Ill.

[73] Assignee: Marvin Glass & Associates, Chicago, Ill.

[21] Appl. No.: 430,558

[22] Filed: Sep. 30, 1982

[51] Int. Cl.³ .............................. A63F 9/20; A63F 9/22
[52] U.S. Cl. ................................ 273/1 GC; 273/85 G; 273/DIG. 28
[58] Field of Search ............ 273/85 G, DIG. 28, 1 E, 273/1 GC

[56] References Cited

U.S. PATENT DOCUMENTS 4,415,153  11/1983  Yokoi ................................ 273/85 G

FOREIGN PATENT DOCUMENTS 2081110  2/1982  United Kingdom ............ 273/85 G

Primary Examiner—Richard C. Pinkham
Assistant Examiner—Mary Ann Stoll Lastova

[57] ABSTRACT

A method and apparatus for a video game in which a player controllable video player image positions video dominos at predetermined positions along a continuous line while one or more machine controlled video intruder images attempt to interfere. Manual player controls move the player image to place the domino images and to protect against interference by the intruder images which could result in a chain reaction of falling dominos. The player manually selects either a place mode allowing the player image to place additional dominos or a protect mode for protecting itself or the dominos from an intruder. In an alternative embodiment, the player image also knocks over dominos while in the place mode. Duration of play is timed by a machine controlled image proceeding in a peripheral path to knock over the initial domino. Difficulty is increased by the complexity of the domino pattern, the timed duration, and the intruder images.

33 Claims, 7 Drawing Figures

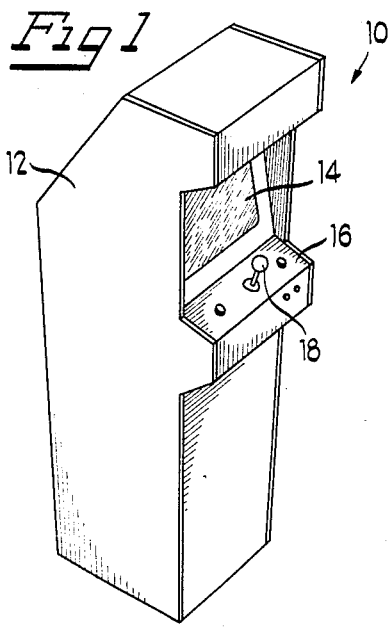
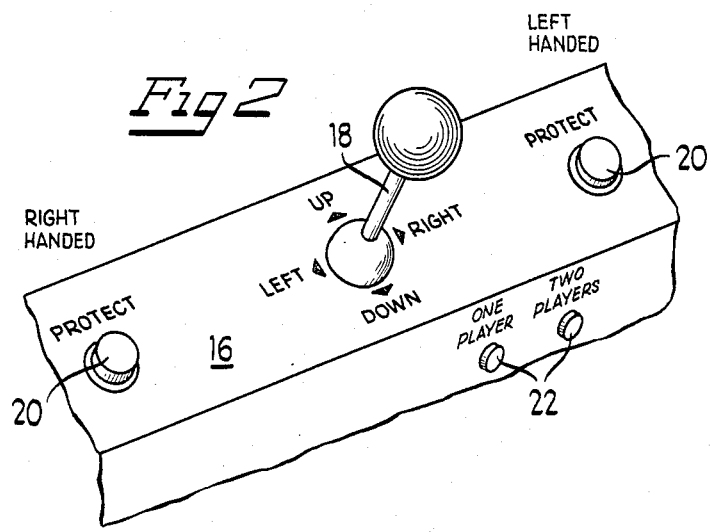
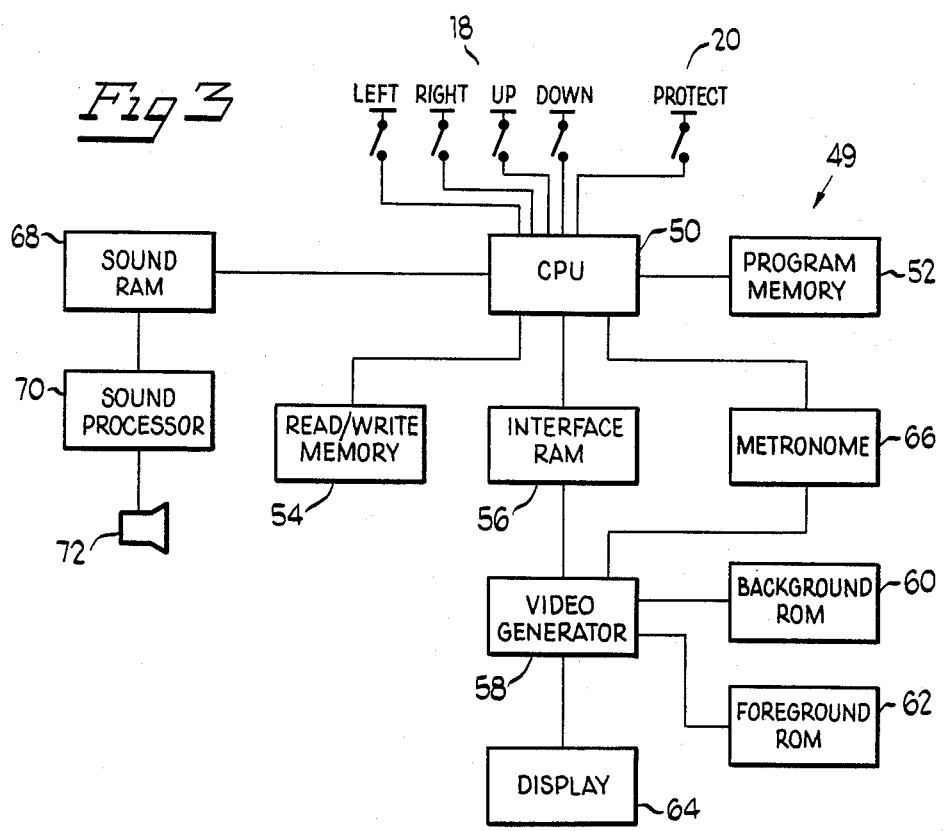

Fig 4
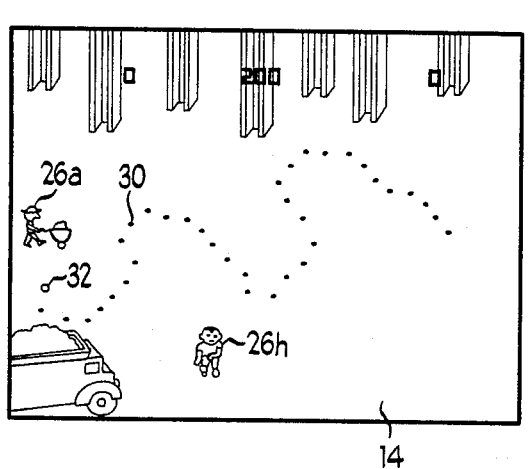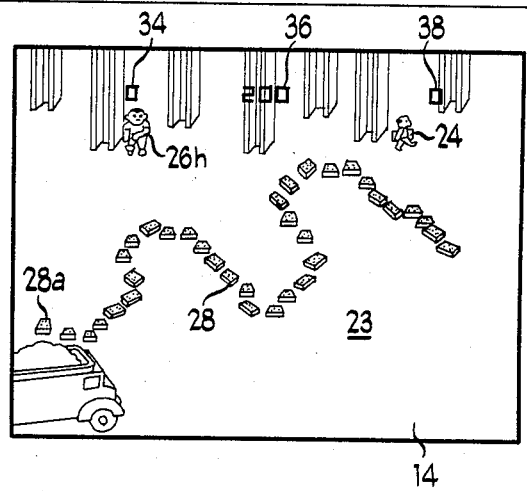
Fig 5
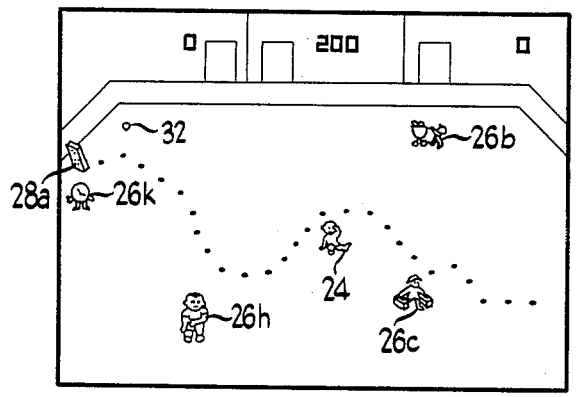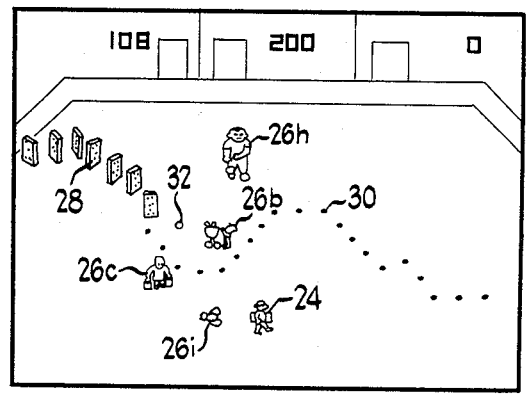
Fig 6
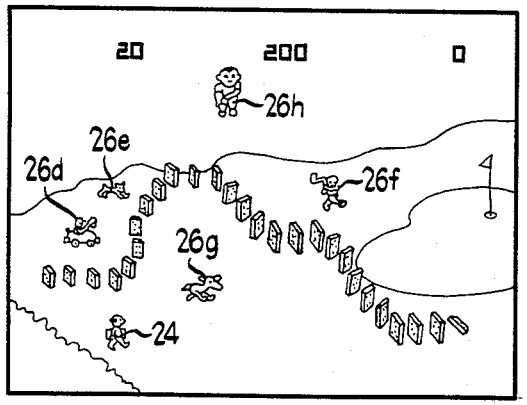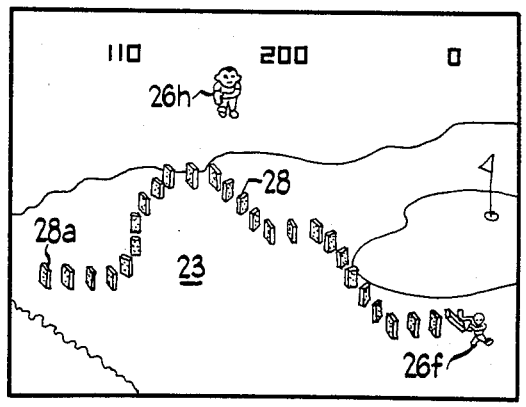

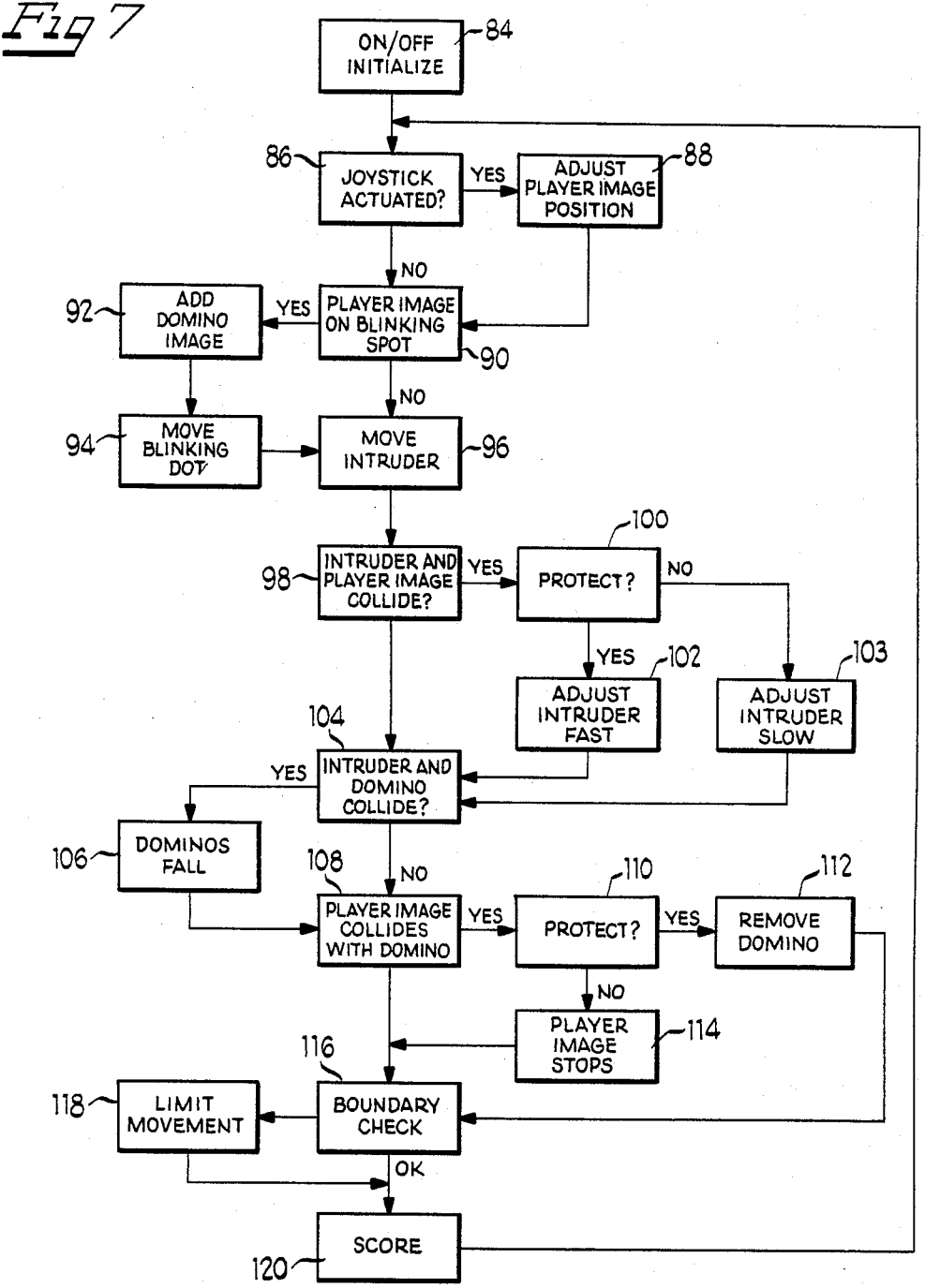

DOMINO, OR THE LIKE, PLACING VIDEO GAME

BACKGROUND OF THE INVENTION

1. Field of the Invention

This invention relates generally to toys and games and more particularly to a computer implemented game playable in conjunction with a video screen.

2. Description of the Background Art

Video games, including those playable in arcades as well as those playable in conjunction with home TV sets, are presently enjoying extraordinary popularity. A variety of patents have been issued which relate to video game apparatus and methods including U.S. Pat. Nos. 4,148,485, 4,104,625, 4,167,019, 4,045,789, 4,169,272, 4,129,883, 4,099,719, 4,189,145, 4,054,919. While the diversity of video games is large, there is a continuing demand for new and improved games of this type.

SUMMARY OF THE INVENTION

It is a primary object of the present invention to provide a new and improved video game device and method.

These and other objects of the present invention are provided by a game device implemented on a video display screen. The device includes a housing and means within the housing for generating video display data transformable by the display screen into video display images including a player controllable image, one or more machine controlled images, and playing piece images. The player operated control means on the housing permits manual control of the generating means to vary the position on the screen at which the player controllable image is displayed. The player operated control means includes means for generating video signals corresponding to a display screen image of the player controllable image associating the playing piece images in continuous array. Means within the housing automatically control the generating means to vary the position on the screen at which a machine controlled image is displayed. The automatic controlling means includes means for directing at least one machine controlled image to interfere with the playing piece image array. The player controllable image is positionable by the player operated control means to protect against interference by the machine controlled image. Another machine controlled image may be provided to directly attack the player controllable image along with player controllable defense means.

In accordance with one embodiment of the present invention a method of generating a video game display and controlling the play of a game on video display in response to operation of player controls involves the step of generating video display data transformable by the display into video display images including player controllable images, a machine controllable image, and playing piece images. The video display data are adjusted in response to manual operation of the player controls to vary the position of the player controllable image. Data is generated corresponding to a preprogrammed pattern of playing piece image positions on the display. Automatically, data corresponding to a video indication of the next position to be occupied by one of the playing piece images is produced. The video data is monitored to detect data corresponding to the location of the player controllable image at a designated location related to the video indication. Video display data are then automatically generated that correspond to a playing piece image situated on a playing position in response to detecting the player controllable image at the designated location. The video display data is automatically adapted to produce a video image of a machine controllable image attempting to interfere. The method also includes the step of detecting a collision corresponding to a close association of the machine controlled image with the player controllable image. At least temporarily, the attempted interference by the machine controllable image is terminated in response to the detection of a collision.

BRIEF DESCRIPTION OF THE DRAWING

FIG. 1 is a perspective view of one embodiment of the present invention;

FIG. 2 is a perspective view of the control panel used in the embodiment shown in FIG. 1;

FIG. 3 is a block circuit schematic useful in implementing the embodiment shown in FIG. 1;

FIG. 4 is a depiction of two frames of display that may be implemented by one embodiment of the present invention;

FIG. 5 is a depiction of two frames of video display in accordance with another game format that may be implemented by one embodiment of the present invention;

FIG. 6 is a depiction of still two other frames in accordance with a third game format that may be implemented by one embodiment of the present invention; and FIG. 7 is a flow chart illustrating exemplary programming for the embodiment shown in FIG. 1.

DETAILED DESCRIPTION OF THE PREFERRED EMBODIMENT

Referring to the drawing wherein like reference characters are used for like parts throughout the several views, a video arcade device 10, shown in FIG. 1, may include a housing 12 and a video display screen 14. A control panel 16 is defined on a front face of the housing 12. As shown in FIG. 2, the control panel 16 includes a plurality of player actuable controls including a multi-position joystick 18, a pair of play controlling pushbuttons 20 and a pair of "one" or "two" player select pushbuttons 22.

Through the various player operable controls on the control panel 16 the player is able to interact with the device 10 to implement a variety of enjoyable video game sequences or racks. As shown in FIGS. 4–6 each of the game formats includes a video playing field 23, a player controllable image 24, at least one machine controlled image 26 and a plurality of playing piece images 28. Conveniently both the images 24 and 26 are animate or humanoid in appearance while the playing piece images 28 are in the form of blocks or dominos.

In each of the illustrated games the player controllable image 24, under user control, attempts to arrange the playing piece images 28 in a continuous array in the form of a domino chain. At the same time the machine controlled image 26 attempts to interrupt the player controllable image 24 in the course of its efforts to assemble the playing piece images 28 in the desired pattern. More specifically, the machine controlled image 26 moves under the automatic control of the device 10 attempting to knock over the first image 28a directly or by initiating a chain reaction of falling playing piece images 28.

The player controllable playing image 24 can be selectively placed in either of two modes through the operation of a pushbutton 20. In one state, conveniently the unactuated state, the game is in a "place" mode that enables the image 24 to position a playing piece image 28 on the playing field 23. In the illustrated embodiment, the pattern for positioning the objects 28 is preselected for a given sequence by the apparatus from a number of preprogrammed arrangements. However, one alternative embodiment may provide for the player's selection or construction of any continuous array of objects 28 that extends from one pre-selected boundary of the playing field 23 to an opposed boundary at predetermined intervals. In such an alternative embodiment, objects 28 would be automatically placed at spaced intervals along the path determined by the operation of the joystick 18 control whenever the game is in the place mode.

In the illustrated embodiment, the machine selected pattern is displayed on the playing field 23 by a series of spaced indicators 30. The machine determines the position on the pattern at which the next playing piece 28 is to be placed and displays a marker 32 adjacent the indicator 30. The object 28 is positioned on the adjacent indicator 30 when the image 24 is in the place mode and located on the flashing machine positioned marker 32.

In order to protect against interference from the machine controlled images, the player may use the image 24 to either collide with the interfering machine controlled image to affect its movement or remove objects 28 already positioned in the path of the machine controlled image. When either pushbutton 20 is operated, the playing image 24 is placed in its "protect" mode. In the protect mode the image 24 moves faster and removes each playing piece image 28 that it contacts. In either mode, the image 24 affects the movement of the machine controlled image 26 upon collision with image 24. However, in its faster protect mode, the image 24 pushes the image 26 at a faster rate. As used herein the terms "collision," "collide," "contact," "interfere" and "interference" refer to a close positional association between two video images. As a variation there could be no resulting effect on the movement of the machine controlled image from collision with the player controlled image 24 during the place mode. Further variations could provide for the player controllable image 24, while in the place mode, to itself knock over already positioned images that it contacts. Accordingly, the game play in this alternative would be more difficult since the player controlled image 24 can itself either directly or by chain reaction knock over the initial playing piece image 28 resulting in the termination of a player turn or "life."

In the illustrated embodiment, the playing piece image 28 with which a machine controlled intruder image 26 interferes falls back toward the initial image 28a regardless of the direction of movement of the image 26 at the time of collision. However, an alternative could provide for the placed object 28 to fall in the direction of the resulting impact to create further variations of play.

Referring now to FIG. 4, in a game with a construction site format, the player controllable image 24, as in all of the illustrated formats, is in the form of a man placing dominos, while the machine controlled image 26a is in the form of a worker pushing a wheelbarrow. A plurality of video indicators 30 mark the spaced positions along a continuous line at which the various playing piece images 28 must be positioned by the player. The flashing video marker 32, positionable adjacent each indicator 30 in turn, indicates the location where the next playing piece image 28 must be located. When the player controllable image 24 is positioned atop the marker 32 through the use of the joystick 18, a playing piece image 28 is automatically positioned atop the adjacent video indicator 30 if the game is in the place mode.

During the progress of the game, after a predetermined time interval, the machine controlled image 26a automatically enters the display screen at a machine selected position and moves across the screen in a programmed path. The image 26a can be redirected and moves in the direction pushed, reversing direction if necessary, in response to a collision instituted by the player between the player controlled image 24 and the machine controlled image 26a. The image 26a will, under machine control, eventually leave the playing field 23, but may also be pushed or driven off the field as a result of colliding with image 24. After a delay period the image 26a will reenter the playing field 23. The length of time that the intruder 26 remains off the playing field 23 can be successively shortened as a function of the number of times it has previously been off-screen during any one game sequence. If the machine controlled image 26 impacts against one or more of the playing images 28, it will knock them down, and, may cause, depending on the continuity of the array, a chain reaction of falling playing pieces 28. The chain reaction stops at an open space in the pattern but otherwise proceeds back to the first domino 28a.

Other machine controlled intruder images 26 may be provided at predetermined time intervals including, for example, a construction worker carrying a ladder (not shown) appearing on the screen at programmed positions and time intervals and moving diagonally across the screen spinning with the ladder and changing direction randomly. Alternatively, a construction worker with a jack hammer (not shown) may appear at a random position, move diagonally across the screen bouncing up and down, and changing direction at random time intervals.

When there are a number of intruder images 26 in a sequence at one time, they are programmed for priority of displacement so that collisions between the images 26 do not result in a stalemate but instead enhance the play of the game. Accordingly, a player image 24 may push one intruder image into another of lower priority and obtain a combination effect to change the movement of both of the images.

A second game or format, shown in FIG. 5, includes background display scenery 40, conveniently in the form of a parking lot. Again the video game indicators 30 are provided together with the markers 32 to indicate the position in which various domino images 28 are to be placed. In this game a machine controlled image 26b, conveniently in the form of a shopper pushing a shopping cart, may appear randomly and move from side to side generally horizontally across the screen. The intruder image 26b can be pushed by the player controllable image 24 and will move in the direction pushed, reversing direction if necessary. An additional machine controlled image 26c in the form of a lady carrying shopping bags appears in the parking lot scene after a predetermined interval, entering randomly from one of the door images 42. The image 26c, moving generally vertically along the screen, can be pushed and will move in a direction pushed, reversing direction if necessary. Like the other intruders, those in the parking lot game sequence attempt to interfere with the arrangement of the playing piece images 28 in the array.

As shown in FIG. 6, in a third game format, background scenery 44 in the form of a golf course is displayed together with various playing piece images 28 that may be arranged on the video indicators 30 (not shown) by the player controllable image 24. In this game a machine controlled image 26d in the form of a golfer driving a golf cart appears on the golf course 44 entering randomly from either side, from a randomly selected vertical position and moving horizontally across the screen. The intruder 26d can be pushed by the image 24 and the intruder then moves in the directed pushed, reversing direction if necessary. In addition an intruder 26e in the form of a gopher appears on the golf course scene 44 entering randomly from either side at a randomly selected vertical position and moving horizontally across the screen. Stopping randomly, the image 26e sits up, looks around, moves up or down, and continues or reverses direction. The gopher image 26e can be pushed and moved in a direction pushed reversing direction if necessary. A third machine controlled image 26f in the form of a golfer appears on the golf course scene entering at a randomly selected time, at a random vertical position, moving diagonally across the screen, swinging his golf club as he moves, and at random time intervals changing direction. The image 26f can be pushed and will move in the direction pushed, but will not always continue off the screen, as do horizontally and vertically moving intruders, because of its own preprogrammed changes in direction.

While only three game sequences have been described above, it will be obvious to those skilled in the art that a variety of other games along the same lines may be provided. Conveniently the three formats described above each have a different pattern of indicators 30 and are each implemented one after the other by a single device 10, if the player wins the preceding game sequence. After the three initial sequences are completed a new cycle of the same three formats may be undertaken. In each new cycle the arrangement of the indicators 30 changes and preferably the level of difficulty increases. For example, in succeeding games the speed of the intruders 26 may increase and the number of images 28 that must be positioned by the player also may increase and the patterns may be more complex. In addition, the duration of succeeding sequences may be shortened.

Each of the game described above may be supplemented by a variety of additional video effects. For example, an intruder image 26g in the form of a dog may appear in each of the games preferably after the player has completed the initial set of sequences in order to add interest and difficulty to the succeeding sequences. The dog image 26g enters randomly from either side at machine selected vertical positions and moves horizontally across the screen. It may stop at random time invervals, move up or down and continue or reverse direction. The dog image 26g can be pushed by an image 24 and will move in the direction pushed, reversing direction if necessary. If the dog image 26g collides with the player controllable image 24, the dog image 26g moves off of the screen. Any images 28 impacted by the image 26g are knocked over.

In addition a bully image 26h may be provided with each of the games. The bully image 26h, much larger than the other character images, enters from the top of the screen (for example through one of the doors in the parking lot game). The unstoppable bully image 26h moves vertically down the screen pushing any image 24 in its path. The player controllable image 24 is incapable of changing the course of the bully image 26h but may speed the bully's movement by "walking" or "running" atop the bully's head while in the place or protect mode respectively. If the image 26h collides with any playing pieces 28 they are knocked over.

The only defense against the bully image 26h is for the player to remove the playing piece images 28 the bully image 26h would knock over. The player does this by implementing the protect mode and contacting the playing piece image 28 in the path of the bully image 26h, causing the image 28 contacted to disappear. This prevents the bully image 26h from instituting a chain reaction of falling dominos 28. As an alternative, a domino between the bully's path and the initial domino 28a could be removed to abort the chain reaction. Eventually the bully image 26h makes its way off of the screen.

To add further interest and enjoyment an additional intruder image that directly attacks the player controllable image 24 rather than the pieces 28 may be provided, conveniently in the form of a flying animate image such as a killer bee 26i in FIG. 6. The killer bee image 26i may be programmed to "chase" the player controlled image 24, preferably at a speed that decreases in direct proportion to the proximity of the killer bee image 26i to the player controlled image 26i so that the player may not merely avoid the bee image for a substantial length of time. When the killer bee image 26i collides with the player controlled image 24, the latter is destroyed and the player "life" terminated. The player may protect itself against the killer bee image 26i by leaving the joystick 18 in the neutral central position and depressing the control button 20 to effect the protect mode wherein the movement of the bee image 26i stops and player image 24 appears to swat the killer bee image 26i with a domino image. The apparatus 10 is programmed to monitor the data on the locations of the killer bee image 26i and the player controllable image 24. Upon comparing the data on such locations and detecting coincidence of the image 24 and the bee 26i, the apparatus will produce an image of a stung and stunned player controllable image 24 and thereafter terminate the player turn. However, if the player effects the swatting defense, data on the location of the killer bee and the swatting domino will be monitored for coincidence. When the apparatus detects a "swatting" coincidence, the presence of the killer bee image 26i on the playing field will be temporarily terminated.

The timing of each game sequence may be conveniently displayed by a clock figure image 26k, shown in FIG. 5, that proceeds in a timed predetermined path to knock down the initial object or domino 28a. The length of time required for the clock image 26k to traverse the predetermined path may be shortened or alternatively the path may be changed from sequence to sequence. The player image 24 is incapable of protecting the initial object 28a from collision with the clock figure 26k. The clock image 26k is not programmed to impact with any of the objects 28 other than the initial one. Accordingly, in order to maintain a compatible visual display effect, the predetermined path of the clock image 26k is preferably along the periphery of the playing field 23 so as not to obstruct the array of objects 28.

If in the course of the game one of the playing images 28 already located on an indicator 30 is knocked over by the intruders 26, a chain effect of falling dominos 28 may result in which the images 28 fall one after another beginning with the domino collided with and progressing toward the domino 28a first placed by the image 24. The falling action continues until a position in the chain wherein a domino image 28 is missing or the first placed domino image 28a is reached.

All the domino images 28 which appear to fall as a result thereof disappear and if the domino 28a placed first falls, the image 24 disappears and a new player controllable image 24 appears, to replace the previous player controllable image and this exhausts one of the player's predetermined number of "lives." The player may be awarded additional "lives" as a reward for attaining certain goals, such as 20,000 points. When all the video indicators 30 have playing images 28 in position atop them, a game is completed and a new game with a different scene begins.

When the last of a player's number of images 24 has been used up or time has expired, all the dominos 28 previously arranged will begin to fall, each game reappearing so that the various dominos 28 which have been arranged appear to fall in a chain reaction. Each of the successive programmed patterns begins where the previous one ended to create a continuous pattern line or chain. This proceeds until the sequence is completed, the player controllable image 24 being visible throughout, running beside the falling images 28 and finally, after all the dominos have fallen, the image 24 sits down and cries (See FIG. 5).

A score display is conveniently provided in the upper portion of the display screen, the first indicator 34 displaying a first player's score, the second indicator 36 displaying the highest score yet achieved and the third indicator 38 displaying a second player's score if applicable. A number of points, conveniently 100 points, are awarded for each playing piece 28 which is placed by a player. Additional points, conveniently 30 points per second, are awarded for pushing an intruder in the form of a machine controlled image 26 away. Still additional points, conveniently 50 points, are awarded for reversing an intruder's direction, and conveniently one hundred points are provided for pushing an intruder completely off the display screen. Bonuses also are awarded for proceeding through an entire game without having any of the playing pieces 28 knocked down, and additional bonuses are awarded for completing a game without losing a player controllable image 24.

Referring now to FIG. 3, an exemplary electronic apparatus 49 for implementing the present invention includes a microprocessor unit 50 connected to a plurality of player operable controls, namely the "left" "right" "up" and "down" 51d switches of the joystick 18 and the "protect" switch of the pushbutton 20.

In addition, the CPU 50 is connected to a nonvolatile program memory 52, an interface RAM 54, a read/write memory 56 and a sound RAM 58. The basic game program is stored in memory 52. The read/write 54 stores current information for a particular game apparatus 10 such as high score, number of coins deposited and the like. In addition, memory 54 stores current game information that is erased at the start of every game such as game score, plus information that is current for each rack or sequence such as the time delay before an intruder image 26 reappears.

The interface RAM 56 includes the input/output binary information for implementing, in different positions, the images 24, 26, and 28. The RAM 56 is connected to a video generator 58 which also receives input from a background picture ROM 60 and a foreground picture ROM 62. Included in the generator 58 is a field comparator that properly integrates the background and foreground scenes. The video generator 58 drives a conventional video display 64. A metronome 66 also driven by the video generator 58 is connected to the CPU 50 so that the CPU is synchronized with the video generator 58.

The sound RAM 68 is connected to the CPU 50 and to a sound processor 70 for driving the speaker 72 to produce audio effects that further the play of the game. While a variety of well known devices can be used as the apparatus 49 one suitably adaptable commercially marketed apparatus is described in the publication "Midway's KICK-MAN Parts and Operating Manual," December, 1981, included herewith as Appendix A and expressly incorporated by reference herein.

A flow chart, shown in FIG. 7, describes one exemplary manner of programming the device 10. As indicated by the block 84, all the various video data are initialized and the memory cleared to begin the play of the game. Initialization may be implemented, for example, upon receipt of a predetermined amount of change within an appropriate change slot. Thereafter, the CPU unit 50 monitors the various player control switches to determine if the joystick 18 or pushbuttons 20 or 22 have been actuated, as indicated in block 86. If the joystick 18 has been actuated, the position of the player controllable image 24 is adjusted in accordance with the instructions received, as indicated in block 88. In any case, a check is made to determine if the player controllable image 24 has been located on the blinking marker 32, according to block 90, and if this is the case an additional playing piece image 28 is added over the appropriate video indicator 30, as indicated in block 92, and the blinking marker 32 is automatically moved to the next open position or back to the first of any prior open positions (Block 94).

At block 96, the position of one or more machine controlled images 26 is determined and thereafter adjusted in accordance with program instructions. A continuous check is made (Block 98) to determine if the player image 24 and any intruder image 26 collide or come into close association. If this is the case, a check is made (Block 100) to determine whether the player has operated one of the play controlling pushbutton switches 20. If so, the position of the intruder image 26 is then adjusted at a faster speed (Block 102). However, if the protect button 20 has not been actuated the position of the intruder image 26 is affected at a slower speed (Block 103). Next a check is made to determine whether one of the machine controlled playing pieces 26 has interfered with one of the playing pieces 28 (Block 104). If this is the case, the affected domino or playing piece image 28 falls and any dominos or playing pieces 28 in its path are similarly affected (Block 106).

If the playing piece 24 is found to have contacted one of the playing pieces 28 (Block 108), a check is made to determine if one of the buttons 20 has been operated (Block 110) and, if this is the case, the adjacent playing piece 28 is removed (Block 112). If the protect button 20 has not been actuated, the movement of the player controlled image is stopped until a change of direction is effected through use of the joystick control (Block 114).

Thereafter the device 10 makes a check to determine if various boundary conditions defining the size of video display screen have been violated and, if this is the case, the movement of the various playing pieces is limited in accordance with those boundaries (Blocks 116 and 118). Finally, the device continuously monitors the game activity and appropriates a score in accordance with the player's success or lack thereof (Block 120). After the completion of one scoring round or game the device recycles and proceeds to implement the next frame, round or game, as the case may be.

It should be understood that numerous modifications of the invention described herein can be devised by those skilled in the art that fall within the spirit and scope of the principles of this invention, even if the invention is not practiced as specifically described herein. For example, instead of implementing the present invention as an arcade apparatus, it could be implemented instead as a home video adapter for a consumer television set.

What is claimed and desired to be secured by Letters Patent of the United States is:

1. A method of generating a video game display and controlling the play of a game on a video display in response to the operation of player controls, the method comprising the steps of:
    generating video display data transformable by said display into video display images including a playing field image, a player controllable image, a machine controllable image and playing piece images;
    adjusting said video display data in response to manual operation of said player controls to vary the location of said player controllable image on said video display;
    monitoring said video data to detect data corresponding to the location of said player controllable image;
    generating data for placement of playing piece images at predetermined intervals in an array;
    comparing said player controllable image location data with said placement data for coincidence;
    generating video display data corresponding to the placement of playing piece images in an array coincident with said placement data in response to said coincidence;
    adapting said video display data to produce a video image of said machine controllable image moving to interface with said playing piece image array;
    detecting a collision corresponding to a close association of said machine controllable image with said player controllable image;
    terminating, at least temporarily, any attempted interference by said machine controllable image with said playing piece image array, in response to the detection of the collision;
    generating data corresponding to a machine selected pattern of playing piece image positions on said display; and
    automatically producing data corresponding to a video indication of the next position in said pattern to be occupied by one of said playing piece images including producing data corresponding to a video marker located adjacent to the position to be occupied.

2. The method of claim 1 including the step of generating data corresponding to a playing piece image on one of said next position when the player manipulates said player controllable image onto said video marker.

3. A method of generating a video game display and controlling the play of a game on a video display in response to the operation of player controls, the method comprising the steps of:
    generating video display data transformable by said display into video display images including a playing field image, a player controllable image, a machine controllable image and playing piece images;
    adjusting said video display data in response to manual operation of said player controls to vary the location of said player controllable image on said video display;
    monitoring said video data to detect data corresponding to the location of said player controllable image;
    generating data for placement of playing piece images at predetermined intervals in an array;
    comparing said player controllable image location data with said placement data for coincidence;
    generating video display data corresponding to the placement of playing piece images in an array coincident with said placement data in response to said coincidence;
    adapting said video display data to produce a video image of said machine controllable image moving to interfere with said playing piece image array;
    detecting a collision corresponding to a close association of said machine controllable image with said player controllable image;
    terminating, at least temporarily, any attempted interference by said machine controllable image with said playing piece image array, in response to the detection of the collision; and
    determining whether said game is in a player control selected place mode or a player control selected protect mode, and determining the outcome of a detected collision depending on the mode of said game.

4. The method of claim 3 including the steps of indicating a collision when said game is in one of said modes and not indicating a collision when said game is in the other of said modes.

5. The method of claim 3 including the steps of generating data to change the movement of said machine controlled image as a result of said collision and producing a corresponding video image.

6. The method of claim 3 including the steps of effecting one change in movement of said machine controlled image when said game is in one of said modes and effecting a different change in movement when said game is in the other of said modes.

7. The method of claim 3 including the steps of:
    adapting said video display data to produce a video image of another machine controllable image moving to interfere with said player controllable image;
    detecting a collision corresponding to a close association of said other machine controllable image with said player controllable image; and
    generating data terminating movement of said player controllable image upon detecting said collision with said other machine controllable image and producing a corresponding video image.

8. The method of claim 7 including the steps of automatically generating data creating defensive movements of said player controlled image and producing a corresponding video image when said game is in the protect mode, monitoring and comparing the defensive data and data on the location of the other machine controlled image and generating data transformable into a visual display terminating the other machine controlled image upon determining coincidence.

9. The method of claim 8 including the step of generating data corresponding to the stopping of the movement of said other machine controlled image when said game is in the protect mode.

10. A method of generating a video game display and controlling the play of a game on a video display in response to the operation of player controls, the method comprising the steps of:

generating video display data transformable by said display into video display images including a playing field image, a player controllable image, a machine controllable image and playing piece images;

adjusting said video display data in response to manual operation of said player controls to vary the location of said player controllable image on said video display;

monitoring said video data to detect data corresponding to the location of said player controllable image;

generating data for placement of playing piece images at predetermined intervals in an array;

comparing said player controllable image location data with said placement data for coincidence;

generating video display data corresponding to the placement of playing piece images in an array coincident with said placement data in response to said coincidence;

adapting said video display data to produce a video image of said machine controllable image moving to interfere with said playing piece image array;

detecting a collision corresponding to a close association of said machine controllable image with said player controllable image;

terminating, at least temporarily, any attempted interference by said machine controllable image with said playing piece image array, in response to the detection of the collision; and detecting a contact corresponding to a close association of said player controlled image and any of said playing piece images in said array and generating a collision image.

11. The method of claim 10 including the step of generating data corresponding to a displacement of said playing piece image upon detecting said interference.

12. The method of claim 11 including the steps of determining whether said displaced playing piece image collides with an adjacent playing piece image and generating data corresponding to an image of any playing piece image with which said displaced playing piece image collides, being displaced.

13. The method of claim 11 including the steps of determining the angle at which said machine controlled images interferes with one of said playing piece images and directing said playing piece image to displace away from the direction of impact.

14. The method of claim 12 including the steps of determining whether said displaced playing piece image collides with any adjacent playing piece image and directing any playing piece image with which said displaced playing piece image collides to displace away from the direction of impact.

15. The method of claim 10 including the steps of determining whether said game is in a player control selected place mode or a player control selected protect mode, and determining the outcome of the detected contact depending on the mode of said game.

16. The method of claim 15 including the steps of generating data and producing an image of the movement of said player controllable image being stopped upon contact with the playing piece image when said display is in one of said modes and generating an image of a disappearing playing piece image when the display is in the other of said modes.

17. The method of claim 15 including the steps of generating an impact image of a displacing playing piece when said game is in one of said modes and generating an image of a disappearing playing piece image when the game is in the other of said modes.

18. The method of claim 3 including the steps of accruing a score in accordance with the performance of a player in operating said player controllable images, and accumulating said score in order to provide a total score for each player.

19. A game device implemented with a video display screen, said device comprising:

a housing;

means within said housing for generating a playing field for display on said screen;

means within said housing for generating video display data transformable on said display screen into video display images, including a player controllable image, a machine controlled image, and playing piece images;

player operable control means on said housing for manually controlling said generating means to vary the position on said screen at which said player controllable image is displayed, said player operable control means including means for generating video signals corresponding to a display screen image of said player controllable image associating said playing piece images in an array;

means within said housing for automatically controlling said generating means to vary the position on said screen at which said machine controlled image is displayed, said automatic controlling means including means for positioning said machine controlled image to interfere with said playing piece image array;

said player controllable image positionable by said player operable control means to protect said playing piece image array from said machine controlled image; and a first mode being operative to control the positioning of said playing piece images on said video display and a second mode being operative to protect said array from said machine controlled images by said player controllable playing image and mode select means for enabling manual selection of one of said modes.

20. The game device of claim 19 wherein said mode select means includes a pushbutton switch.

21. The game device of claim 19 wherein said mode select means includes means for determining the current mode of said mode select means, means for detecting a collision between said player controllable image and said machine controlled image and means for generating a collision image in accordance with the current mode.

22. The game device of claim 21 including means for detecting a contact between a player controllable image and a playing piece image, means for generating a resulting contact image when said mode select means is in one of said modes and said detect means detects a contact between said player controllable image and a playing piece image, and means for generating an image of a disappearing playing piece image when said mode select means is in the other of said modes.

23. The game device of claim 22 including means for generating a resulting contact image of said player controllable image being stopped by said playing piece image.

24. The game device of claim 22 including means for generating a resulting contact image of said playing piece image being displaced.

25. The game device of claim 19 including means for detecting an interference between a machine controlled image and a playing piece image, and means for generating an impact image of said playing piece image being displaced.

26. The game device of claim 19 including means for indicating a predetermined pattern of playing positions on said video display screen for associating the playing piece images.

27. The game device of claim 26 further including means for indicating the playing position which should be next filled with one of said playing piece images by said player controllable image.

28. A game device implemented with a video display screen, said device comprising:
   a housing;
   means within said housing for generating a playing field for display on said screen;
   means within said housing for generating video display data transformable on said display screen into video display images, including a player controllable image, a machine controlled image, and playing piece images;
   player operable control means on said housing for manually controlling said generating means to vary the position on said screen at which said player controllable image is displayed, said player operable control means including means for generating video signals corresponding to a display screen image of said player controllable image associating said playing piece images in an array;
   means within said housing for automatically controlling said generating means to vary the position on said screen at which said machine controlled image is displayed, said automatic controlling means including means for positioning said machine controlled image to interfere with said playing piece image array;
   said player controllable image positionable by said player operable control means to protect said playing piece image array from said machine controlled image;
   means for indicating a predetermined pattern of playing positions on said video display screen for associating the playing piece images;
   means for indicating the playing position which should be next filled with one of said playing piece images by said player controllable image; and
   means for detecting the positioning of said player controllable image adjacent the playing position which should be next filled with a player controllable image and means for generating a playing piece image on said position in response to a signal from said positioning detecting means.

29. The game device of claim 28 including a first mode for positioning the playing piece images, a second mode for protecting positioned playing pieces, and a mode select means for enabling manual selection between said modes.

30. The game device of claim 19 wherein said playing field has boundaries and including means for associating playing piece images at predetermined spaced intervals along a continuous line from one boundary of the playing field to another boundary.

31. A game device implemented with a video display screen, said device comprising:
   a housing;
   means within said housing for generating a playing field for display on said screen;
   means within said housing for generating video display data transformable on said display screen into video display images, including a player controllable image, a machine controlled image, and playing piece images;
   player operable control means on said housing for manually controlling said generating means to vary the position on said screen at which said player controllable image is displayed, said player operable control means including means for generating video signals corresponding to a display screen image of said player controllable image associating said playing piece images in an array;
   means within said housing for automatically controlling said generating means to vary the position on said screen at which said machine controlled image is displayed, said automatic controlling means including means for positioning said machine controlled image to interfere with said playing piece image array;
   said player controllable image positionable by said player operable control means to protect said playing piece image array from said machine controlled image;
   means for detecting an interference between a machine controlled image and a playing piece image, and means for generating an impact image of said playing piece image being displaced; and
   means for determining whether said displaced playing piece image collides with any adjacent playing piece image and means for generating a chain collision image of the playing piece image, with which said displaced playing piece image collides, being displaced.

32. The game device of claim 31 including means for determining the angle at which an image collides with one of said playing piece images and means for generating an impact image of said impacted playing piece image being displaced away from the direction of impact.

33. A game device implemented with a video display screen, said device comprising:
   a housing;
   means within said housing for generating a playing field for display on said screen;
   means within said housing for generating video display data transformable on said display screen into video display images, including a player controllable image, a machine controlled image, and playing piece images;
   player operable control means on said housing for manually controlling said generating means to vary the position on said screen at which said player controllable image is displayed, said player operable control means including means for generating video signals corresponding to a display screen image of said player controllable image associating said playing piece images in an array;

means within said housing for automatically controlling said generating means to vary the position on said screen at which said machine controlled image is displayed, said automatic controlling means including means for positioning said machine controlled image to interfere with said playing piece image array;

said player controllable image positionable by said player operable control means to protect said playing piece image array from said machine controlled image; and means for removing a playing piece image from said array to protect the array from an interfering machine controlled image.

* * * * *